United States Patent [19]

Keller et al.

[11] Patent Number: 4,715,003

[45] Date of Patent: Dec. 22, 1987

[54] METHOD FOR TEMPERATURE COMPENSATION AND MEASURING CIRCUIT THEREFOR

[75] Inventors: Hans W. Keller; Michael Von Ritter, both of Winterthur, Switzerland

[73] Assignee: Keller AG fur Druckmesstechnik, Switzerland

[21] Appl. No.: 758,068

[22] Filed: Jul. 23, 1985

[30] Foreign Application Priority Data

Jul. 27, 1984 [DE] Fed. Rep. of Germany ....... 3427743

[51] Int. Cl.$^4$ .............................................. G06F 15/20
[52] U.S. Cl. ..................................... 364/571; 73/766; 364/557
[58] Field of Search ........................ 364/550, 557, 571; 73/720, 721, 765, 766

[56] References Cited

U.S. PATENT DOCUMENTS

| 3,490,272 | 1/1970 | Russell ................................. 73/766 |
| 3,654,545 | 4/1972 | Demark ............................ 323/75 B |
| 3,899,695 | 8/1975 | Solomon et al. ................. 73/727 X |
| 4,192,005 | 3/1980 | Kurtz ................................... 364/571 |
| 4,226,125 | 10/1980 | Waugh .................................. 73/708 |
| 4,419,620 | 12/1983 | Kurtz et al. ......................... 323/280 |
| 4,510,813 | 4/1985 | Kanazawa .............................. 73/766 |

FOREIGN PATENT DOCUMENTS

| 2437438 | 8/1974 | Fed. Rep. of Germany . |
| 3118306 | 12/1982 | Fed. Rep. of Germany . |
| 3318977 | 11/1984 | Fed. Rep. of Germany . |
| 8203121 | 12/1982 | PCT Int'l Appl. . |

OTHER PUBLICATIONS

"Integration Brings a Generation of Low-Cost Transducers", Zias et al.; *Electronics*, Dec. 4, 1972; pp. 83–88.
IBM Technical Disclosure Bulletin, vol. 15, No. 6, Nov. 1972, "Measurement System" A. H. Nay, pp. 1896–1897.

*Primary Examiner*—Emanuel S. Kemeny
*Assistant Examiner*—H. R. Herndon
*Attorney, Agent, or Firm*—Orrin M. Haugen; Thomas J. Nikolai; Frederick W. Niebuhr

[57] ABSTRACT

A measurement circuit for carrying out a method of compensation, in particular for a piezoresistive pressure transducer with a measurement bridge (7) and a following output/differential amplifier (15) further comprises a current supply circuit (13). To enable an optimal temperature compensation for the measurement bridge (7) with maximum resolution of the pressure measurement signal, a digitalized compensation circuit with an analog/digital converter (21), a memory (23) and at least one digital/analog converter (25, 27) is connected ahead of the output/differential amplifier (15). The temperature dependent voltage difference/input signal at the measurement bridge (7) is digitalized via the following converter (21) and converted to compensation values stored in the memory (23). These values are converted into an analog compensation signal in a converter (25, 27). For analog measured value determination per se, only error compensation is carried out in digitalized fashion (FIG. 2).

27 Claims, 6 Drawing Figures

METHOD FOR TEMPERATURE COMPENSATION AND MEASURING CIRCUIT THEREFOR

BACKGROUND OF THE INVENTION

The invention concerns a method for temperature compensation of an analog, temperature dependent differential signal of a pressure measuring circuit, in particular for measuring pressure by means of a piezoresistive pressure transducer wherein a measurement bridge is disposed on a pressure measurement cell to provide a differential output signal which can be fed to a differential amplifier for generation of a pressure measurement signal. An associated measuring circuit is provided which is arranged to provide an indicated reading as a multiple of either the measurement bridge signal or the signal from the differential amplifier.

Piezoresistive pressure transducers have been known for a long time and have proven themselves in practice. They are applied both when measuring for absolute pressures and for reference measurements. Here, the pressure transducers available on the market consist of a pressure cell on whose pressure measuring diaphragm there is provided, as an example, a bridge circuit made up of resistances for measuring pressure.

In practice, however, posed is the problem that the resistance values of the resistances in the bridge circuit are temperature dependent, hence dependent upon the pressure sensor, and, accordingly, the output pressure measurement signal from the measurement bridge also changes with the temperature. Because of this, an exact pressure measurement is not possible.

It has already been proposed to connect an analog compensation circuit on the output side of the measuring bridge in order to obtain a pressure measurement signal less dependent upon temperature. However, these circuits are, in practice, expensive and also do not provide the desired results relative to an exact measurement of pressure.

Furthermore, it has also been made known measuring circuits wherein the analog pressure measurement signal is digitalized and then entered into a downstream computer or calculator. With the aid of the calculator, the digitalized measurement signal is then processed according to computations such that temperature compensation of the measured signal takes place. This method and its associated arrangement, however, also display several disadvantages. For one thing, resolution of the pressure measurement signal is considerably reduced since the entire measured signal must first be digitalized. In doing this, the resolution can correspond maximally only to the individual digital steps. Additionally, the required hardware, in the form of a required calculator or computer, is enormously comprehensive and particularly expensive, so that this method and this arrangement in many cases already precludes, right from the start, an exact pressure measurement.

SUMMARY OF THE INVENTION

In comparison to this, the task of the present invention is to obtain a method for temperature compensation and an arrangement for a measuring circuit, in particular for a piezoresistive pressure transducer, whereby, with relatively simple means, a maximal resolution of the measured signal is possible. Hence, in an analog operation, an optimal compensation capability as a function of temperature is obtained, advantageously such that the measured signal displays a linear pressure dependency, with the measuring circuit capable of being used in practically all applications because of its compact construction. The task is resolved, relative to the method, in accordance with the features wherein the temperature dependent analog voltage difference or input signal from the measurement bridge for temperature compensation is received, digitalized and converted into previously stored temperature compensation values as a function of the magnitude of the digitalized voltage difference, which is reconverted into an analog compensation signal and fed to the measurement circuit for compensation regulation; and, relative to the measuring circuit, in accordance with the features wherein ahead of the output differential amplifier is a digitalized compensation circuit with an analog/digital converter, a memory and at least one additional digital-/analog converter, with the input of the analog/digital converter preferably being connected via a differential amplifier with the input of the measurement bridge and its output with the address input of the following memory, the outputs of which, for the transfer of the digitalized temperature dependent compensation values stored therein are in communication with at least one following digital/analog converter at whose output, in turn, is present the analog compensation signal that is capable of being fed to the measurement bridge.

Advantageous embodiments of the invention are given in the dependent claims.

Procured in surprising fashion, in a simple manner and way, by the method in accordance with the invention while obtaining a high resolution of the pressure measurement signal, is a completely sufficient compensation possibility for temperature dependent measurement signals. This is made possible essentially by the fact that the analog measurement signal is picked off from the measurement bridge as a pressure measuring signal and that, in the case of the resistance that is changing as a function of temperature, the analog voltage difference/input signal from the measurement bridge is first digitalized and that generated, as a function of the magnitude of the digitalized signal corresponding to the previously stored temperature compensation values, is a digitalized compensation signal. This latter is then converted into an analog compensation signal that is used for feedback control. In other words, measuring itself is done in analog fashion with the desired, but otherwise non-achievable, high resolution, with compensation being digitalized.

In one particularly preferred form of embodiment, the temperature dependent digitalized voltage difference/input signal for generating sensitivity compensation and zero point compensation is converted into two different digitalized compensation values and fed to the measurement circuit for appropriate feedback control. Thus there is provided a method in accordance with the invention that converts the temperature dependent voltage difference/input signal into two digitalized compensation signals, one serving for sensitivity compensation and the other for zero point compensation of the measuring circuit. With temperature changes at the measuring circuit, in particular of the measuring bridge, changing on the one hand is the sensitivity of the measuring arrangement and, on the other hand, to be noted is a displacement of the measured signal and that the measured signal, in particular a pressure measurement signal, is superimposed in the case of changed temperature by a qualifying magnitude.

Turning out to be particularly favorable here is that the first digitalized compensation signal for zero point compensation be fed to a control input of an output/differential amplifier (offset-input), and that the second digitalized compensation signal for sensitivity compensation be fed for control of the current supply circuit or of the (output) amplifier.

The measurement circuit in accordance with the invention the compensation including the temperature dependent digitalized voltage difference/input signal for generating sensitivity compensation, and zero point compensation, into two different digitalized compensation values fed to the measurement circuit for appropriate feedback control. Thus the arrangement comprises an analog/digital converter on the output side of the inputs of the measuring circuit (measuring bridge), a memory and at least one more downstream digital/analog converter. In other words, the temperature dependent analog error signal (voltage difference/input signal) serves for addressing the downstream memory in which the temperature dependent compensation values are stored in digitalized form. The digitalized compensation values appearing at the output of the memory are again converted to analog form via the following digital/analog converter and fed back into the measuring circuit for feedback control.

In a further development of the invention, downstream from the memory a digital/analog converter is provided whose output is in communication with (a) the input of the current supply circuit of the measurement bridge; (b) the control input of the output/differential amplifier feedback coupling; and/or (c) the control input (offset-input) of the output/differential amplifier. In each case, the output of the digital/analog converter downstream of the memory is in communication with the input of the current supply circuit or with the control input of the output/differential amplifier for sensitivity compensation and/or with the control input (offset-input) of the output/differential amplifier for zero point compensation.

Further, there are at least two regulating circuits located downstream from the memory, each with a digital/analog converter to which are fed digitalized compensation values stored separately in the memory for the purpose of sensitivity compensation and zero point compensation. An improved result can be achieved if there is both zero point compensation and sensitivity compensation. Stored separately for this purpose in the memory for both compensation methods mentioned are corresponding, digitalized compensation signals that serve for feedback control at the output/differential amplifier and/or for control of the current supply for the measuring circuit.

A further simplification is obtained in the arrangement wherein ahead of the output differential amplifier is a digitalized compensation circuit with an analog/digital covnerter, a memory and at least one additional digital/analog converter, with the input of the analog/digital converter preferably being connected via a differential amplifier with the input of the measurement bridge and its output with the address input of the following memory, the outputs of which, for the transfer of the digitalized temperature dependent compensation values stored therein are in communication with at least one following digital/analog converter at whose output, in turn, is present the analog compensation signal that is capable of being fed to the measurement bridge. When using a memory containing both the digitalized compensation values for the zero point and the sensitivity compensation, there is connected, in each case, to the downstream digital/analog converters for the corresponding compensation a register serving as an intermediate memory that are, for example, stored in cyclically staggered fashion.

To also be able to use the measuring circiut for highly accurate pressure measurements, in a particularly preferred form of embodiment wherein a second compensation regulating circuit for linearity compensation of the measured signal is provided with an analog/digital converter, a memory and another digital/analog converter, with the input of the analog/digital converter being connected with the output of the output/differential amplifier and its output with the address inputs of the following memory, the output of which, for transferring the digitalized linearity compensation values stored therein, is in communication with the downstream digital/analog converter whose analog linearity compensation signal is present at the control input (offset) of a following, adjustable final amplifier whose amplification input is connected in series with the output of the output/differential amplifier. Another compensation control circuit is provided for linearizing the output measurement signal. Hence, through means of this circuit arrangement, the pressure measurement signal is a linear function of the actually measured pressure. In a preferred form of embodiment wherein the circuit is constructed as an integrated circuit, the entire circuit arrangement can be accommodated on a single integrated circuit (IC), whereby because of the simple manipulation, this combination circuit can be used for random pressure measurement.

According to one arrangement, the memory consists of a programmable fixed value memory. Shown to be particularly favorable is the use of a programmable fixed value memory, in particular where individual temperature dependent, digitalized compensation values are determined by a test for each measurement bridge and are stored in the memory. Each individual measuring bridge, in particular across a pressure transducer in the case of varying pressures and temperature, can be measured and then the individually determined types can be stored in the programmable fixed value memory. A simple means for an optimal temperature compensation is thus provided.

Further advantages, particulars and features of the invention are obtained in the following from examples of embodiment explained in more detail with the aid of drawings.

IN THE DRAWINGS

DESCRIPTION OF THE PREFERRED EMBODIMENT

Figure 1:
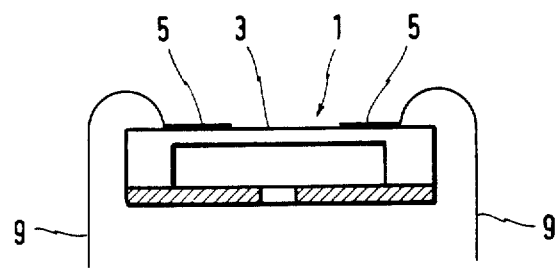
FIG. 1 is a schematic representation of a typical pressure measurement cell with resistances being provided on the measuring diaphragm.

To be referenced in the following is FIG. 1 in which is shown a sectional representation of a piezoresistive pressure transducer with a measurement cell 1 with a measuring diaphragm 3 and resistances 5 thereon. The resistances 5 are disposed in the form of a measuring bridge 7 that is being fed with current from a current supply circuit, via wires 9, with the measured signal being picked off over other lines.

Figure 2:
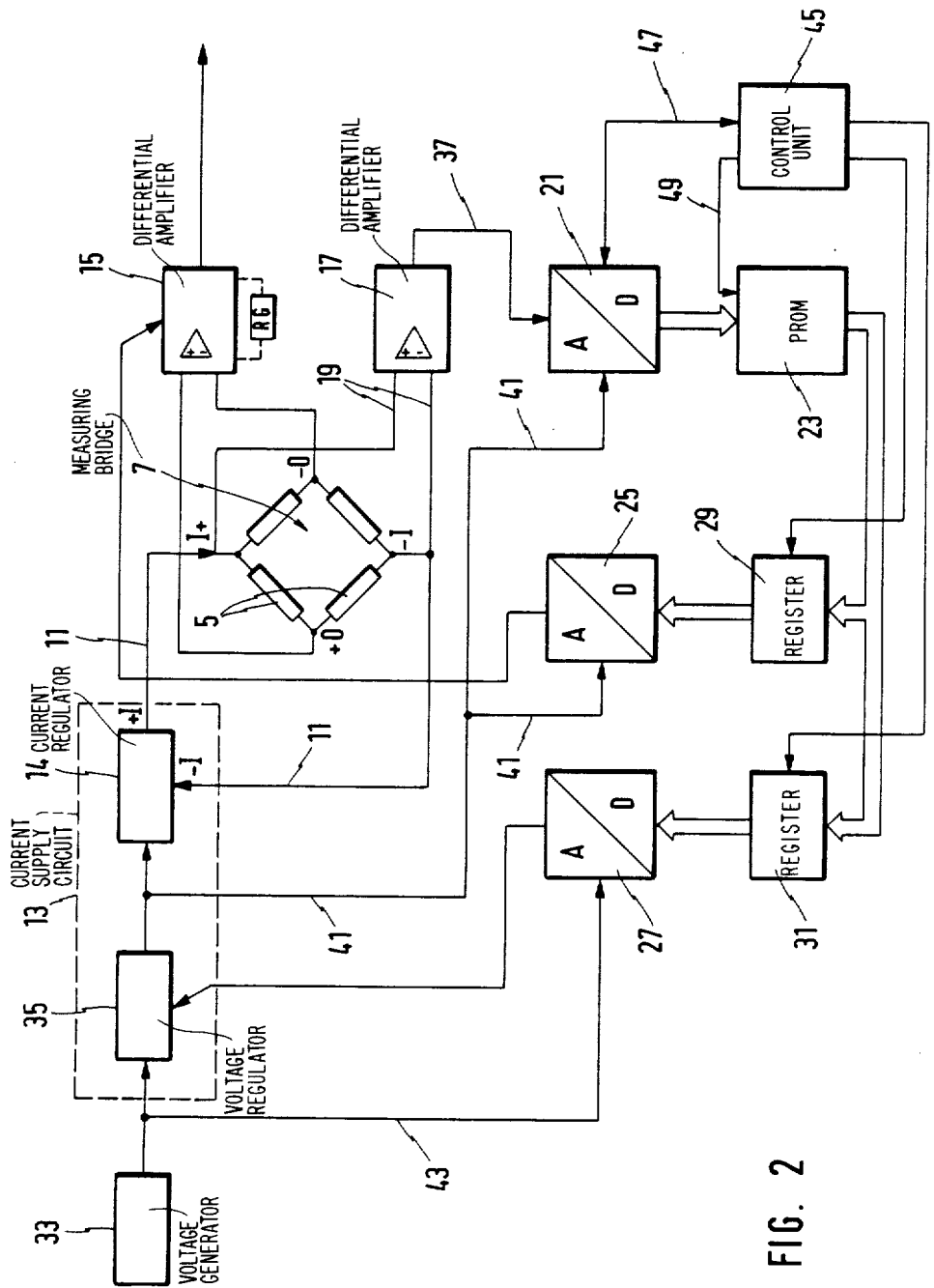
FIG. 2 is a block diagram of the principle of the measuring circuit.

Shown in FIG. 2 is the measuring bridge 7 of the pressure sensor with the resistances 5, wherein the measuring bridge is connected with current via inputs +I and −I, and with the current supply circuit 13 mentioned via feed lines 11. The differential output signal at the oppositely lying outputs +O and −O is fed to an output differential amplifier 15 at whose output is present the analog pressure measurement signal.

As has already been mentioned, however, the pressure measurement signal is temperature dependent so that, with changing temperatures, the measured signal is falsified and, therefore, exact pressure measurements are impossible. Additionally provided is a compensation circuit to be explained in the following, whereby, for achieving a high measurement accuracy, analog measured value determination (as mentioned previously) is retained and only the compensation circuit is provided in digitalized form.

As can be seen in the figure, further provided is another differential amplifier 17 whose inputs are connected with the conductors +I and −I of the measuring bridge via lines 19. Furthermore, the compensation circuit includes a downstream analog/digital converter 21, a programmable fixed value memory 23 and two other downstream digital/analog converters 25 and 27, ahead of which are connected two registers 29 and 31. Further provided is a reference voltage generator 33 and an associated voltage regulating unit 35, through means of which the current supply circuit 13 is controlled and regulated.

The method of operation is gone into in the following.

METHOD OF OPERATION

With a temperature that is changing, also changing with the resistances are the analog voltage difference input signal that is being fed over line 19 to the differential amplifier 17. Its difference voltage/output signal is applied over a line 37 to the following analog/digital converter 21 and is converted into a digitalized compensation signal. Stored in the following fixed value memory 23 (PROM) are digitalized compensation values for compensation of the pressure measurement signals. To obtain a temperature dependent pressure measurement signal, undertaken are both a zero point compensation and a sensitivity compensation.

Additionally, the voltage difference signal digitalized by the analog/digital converter 21 is fed to the address input of the fixed value memory 23 in which, among other things, the compensation values for the zero point compensation are stored in digital form. These values are stored in cyclic fashion in the following register 29. These digitalized values are again transformed into an analog compensation signal, via the following digital-/analog converter 25 that is applied, via line 39, to the offset control input of the output differential amplifier 15. The pressure measurement signal that is changing with a changing temperature in the measurement bridge 7 is corrected by this compensation adjustment, at least partially, in the direction toward the objectively measured value.

However, since in the case of a changing temperature in the measurement bridge 7 there occurs not only a falsification of the measured pressure measurement signal by the addition of a temperature dependent magnitude but rather, moreover, also a change of the sensitivity in the measuring bridge 7, provided for this is a sensitivity compensation. Additionally, likewise as a function of the measured analog voltage difference input signal and, therewith, as a function of the digitilized compensation signal, stored in digital form in the fixed value memory 23 are the other compensation values required for this, which are first stored in the downstream register 31 and fed to the likewise downstream digital/analog converter 27. These compensation values, again transformed here into an analog signal, are then fed to a voltage regulating unit 35 that can correct the reference voltage of a reference voltage generator 33, for example by plus or minus five percent. Also regulated by this changed output voltage is the following current regulating unit 14, in the form of an increase or decrease of the feed current for the measurement bridge 7 therefore leads to a multiplicative change of the difference output signal appearing at the output/-differential amplifier, from which is formed the final pressure measurement signal.

To achieve a functionally-correct method of operation for the analog/digital and digital/analog converters, the regulated reference voltage from the output of the voltage regulating unit 35 is also applied to the analog/digital converter 21 and to the digital/analog converter 25, via lines 41. Applied via line 43 to the second digital/analog converter 27 is the voltage of the reference voltage generator 33.

Figure 3:
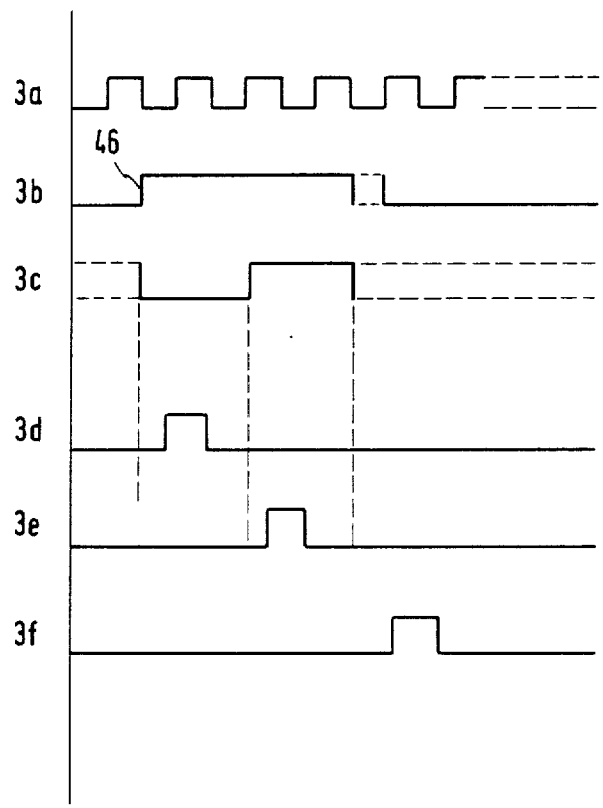
FIG. 3 is a pulse diagram for controlling the measuring circuit.

With reference to FIG. 3, next explained briefly is the control of the compensation circuit achieved through a control unit.

The control unit 45 generates a regular cyclic pulse in accordance with FIG. 3a. As soon as the voltage difference/input signal generated via the differential amplifier 17 is converted in the following analog/digital converter 21 into a digitalized compensation signal, announced from the converter 21, in accordance with FIG. 3b, by the rising flank 46, via the control line 47 to the control unit 45, is that the conversion process into a digitalized signal has been completed.

Afterwards, transmitted over another control line 49 is a control pulse MSB (FIG. 3c) from control unit 45 to the address input at the fixed value memory 23, with simultaneous application, over the time duration of this MSB cyclic pulse with shorter cycle length, a cyclic pulse to register 31 for sensitivity compensation. The digitalized compensation values for sensitivity compensation applied at the output of the fixed value memory 23 by this cyclic pulse are entered into register 31 (FIG. 3d).

By changing the potential of the MSB cyclic pulse in the address input of the fixed value memory 23, the other additionally digitalized compensation values in the memory 23 for zero point compensation are called up and, through means of a next cyclic pulse (FIG. 3e) entered into the second register 29. In doing this, again digitilized during each cycle is an analog voltage/differential input signal corresponding to stored compensation values for zero point and sensitivity compensation, and stored in the associated registers 29 and 31 by reading over the old values. The thusly obtained new values are again converted into analog signals for compensation.

Figure 4:
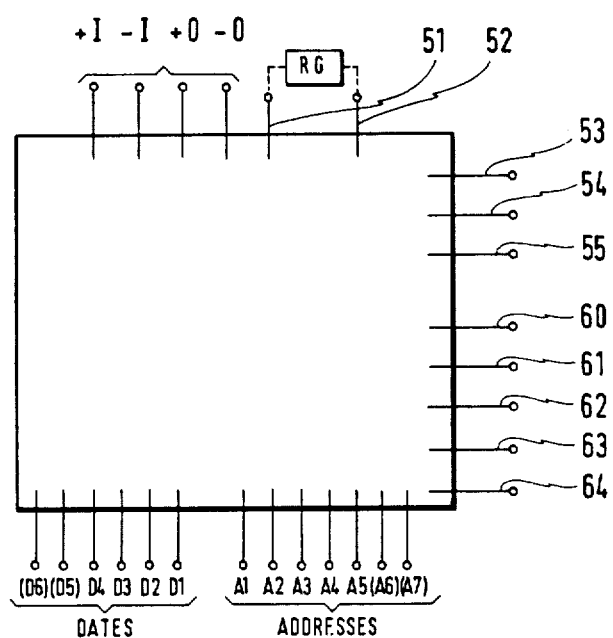
FIG. 4 is a schematic representation of an integrated, associated switching circuit (IC)

Deviating from the example of embodiment shown, it is naturally possible to avoid the cyclically offset call-up and storage in registers 29 and 31 by doubling the address inputs and the outputs at the fixed value memory 23, since then the digitalized compensation values can be entered into the registers 29 and 31 over separate lines. Introduced by means of a start pulse (FIG. 3f) at converter 21 is a new conversion cycle. Demonstrating itself to be particularly favorable and space-saving here is to arrange the precedingly explained circuit according to FIGS. 2 and 3 into the compact form of an integrated circuit (IC) in accordance with FIG. 4. For example, a sufficient circuit capacity can be achieved if four, five, or six-bit digital/analog and analog/digital converters are provided, with the fixed value memory then displaying a capacity of 32×4, 64×5 or 128×6. The number of plug pins would in this case be 23, 25 or 27. For the last mentioned case, the integrated circuit according to FIG. 4 includes six address inputs and six date outputs for the fixed value memory 23. Shown alongside are the still overlying four inputs and outputs to the measurement bridge. Additionally connected at two other inputs 51, 52 is an amplifying resistance RG establishing, rangewise, the magnitude of the pressure measurement signal.

By way of example, the feed voltage is fed, via inputs 53 and 54, to the integrated circuit (IC) whereby the analog pressure measurement signal can be picked off at output 55, after the output differential amplifier 15.

The subsequent five inputs and outputs 60 to 64 serve for testing the circuit arrangement and for programming the integrated circuit.

For a test phase, first an appropriate amplification is provided, and then the change of the output signal is measured for a few pressures, with changing temperature. In doing this, only a few temperatures must be measured; for the remaining temperatures, the compensation values can be interpolated by means of a computer and then stored in the fixed value memory. Then applied at the inputs 60 to 62 are the signals "end of conversion into a digitalized compensation signal", "cyclic pulse for register 31" and "cyclic pulse for register 29." The PROM can be switched out over the input 63, and programming of the fixed value memory 23 can be done over input 64. Following individually tested temperature-dependency the fixed value memory 23 can then be loaded with the appropriate compensation values via the latter mentioned inputs.

Since the resistances in the measurement bridge 7 can vary within certain limits from one transducer to another, the precedingly mentioned, individual test provides the required temperature compensation for the pressure measurement signal in the case of each individual pressure transducer, and the compensation values correspondingly stored.

Hence, this arrangement achieves an increase in precision, compared to usual type compensation circuits, by a factor of 10, with considerably lower test costs, since no further compensation is required. Primarily, it is also possible to compensate for subsequent stability displacements of the zero point without further influencing the function by later connecting an additional potentiometer or resistance in the bridge. Above all, the pressure measurement signal itself displays an infinite resolution since the measuring itself is done in analog fashion and not influenced by frequency response. In closing, let it be noted that it is possible to establish, through means of the fixed resistance mentioned, a normalized or standard output signal with an arbitrary level of, for example, between one volt and ten volts.

The improvement of the error signal in the case of 4-bit, 5-bit or 6-bit converters, in the case of a temperature change of 100° K. can be seen from the following table:

| | Resolution of Sensitivity Compensation | Resolution of Zero Point Compensation | Temperature Resolution | Percent | Maximum Error at the Transducer |
|---|---|---|---|---|---|
| 4 bit | 0.625% | 2 mV | 6.5K | 1.2% | 4.5 mV |
| 5 bit | 0.312% | 1 mV | 3.3K | 0.6% | 2.25 mV |
| 6 bit | 0.156% | 0.5 mV | 1.64K | 0.35% | 1.15 mV |

Figure 5:
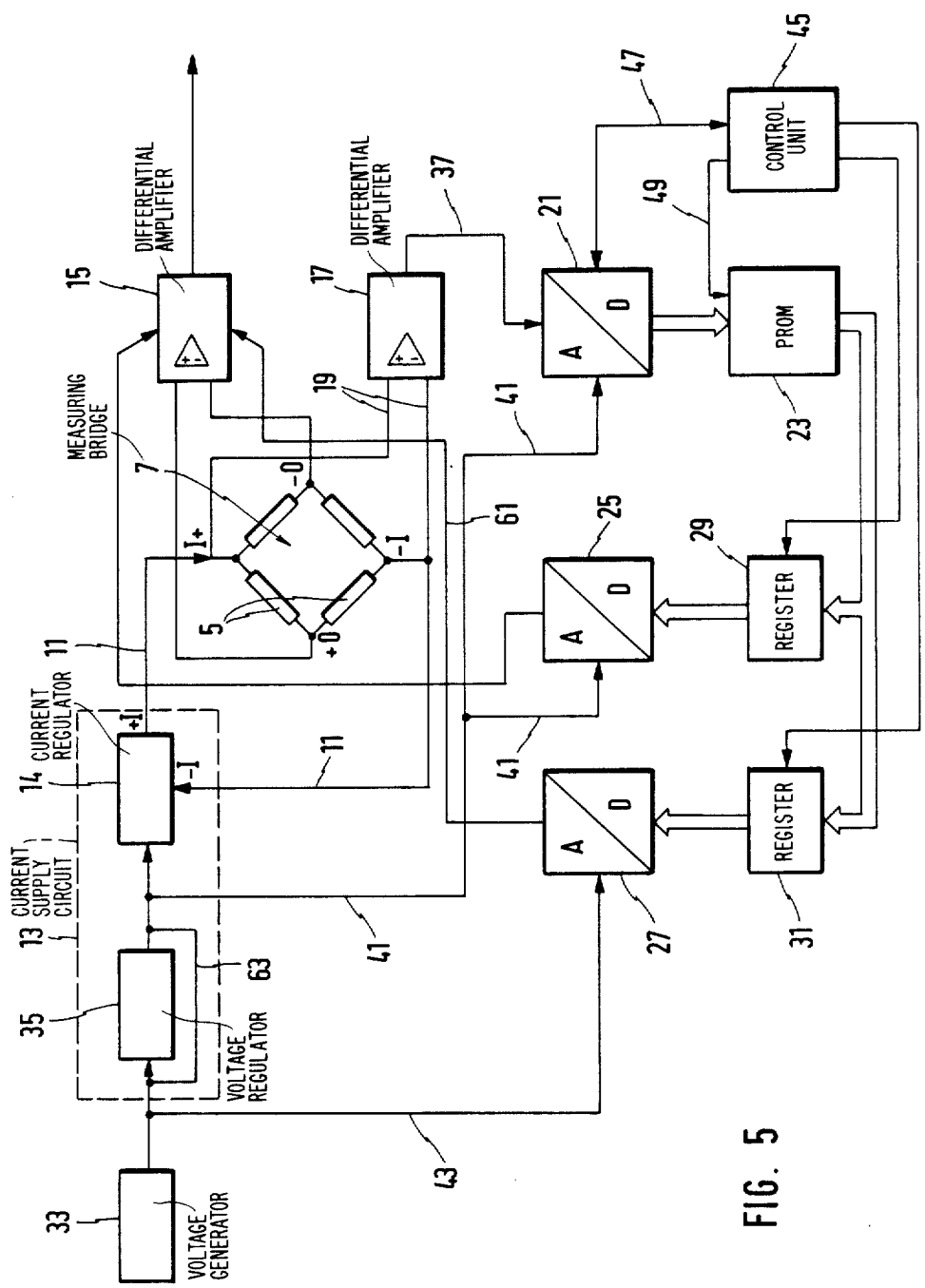
FIG. 5 is a revised block diagram of the principle according to FIG. 2.

Reference is made in the following to FIG. 5 in which is shown a compensation circuit for the sensitivity compensation as an alternative to FIG. 2

This example of embodiment differs from FIG. 2 in that the compensation takes place, not via a changed voltage regulating unit 35 for adaptation of the current present at the measurement bridge 7, but rather via the output differential amplifier 15. For this purpose, the output of the digital/analog converter 27 is connected, via a line 61, with the gain control input of the output differential amplifier 15 for the purpose of feedback coupling, providing a multiplicative compensation for achieving a temperature independent pressure measurement signal. Here, the input of the current regulating unit 14 is further connected, via a line 63, directly with the reference voltage generator 33. Otherwise, the method of operation of this circuit is identical with that explained with reference to FIG. 2.

Figure 6:
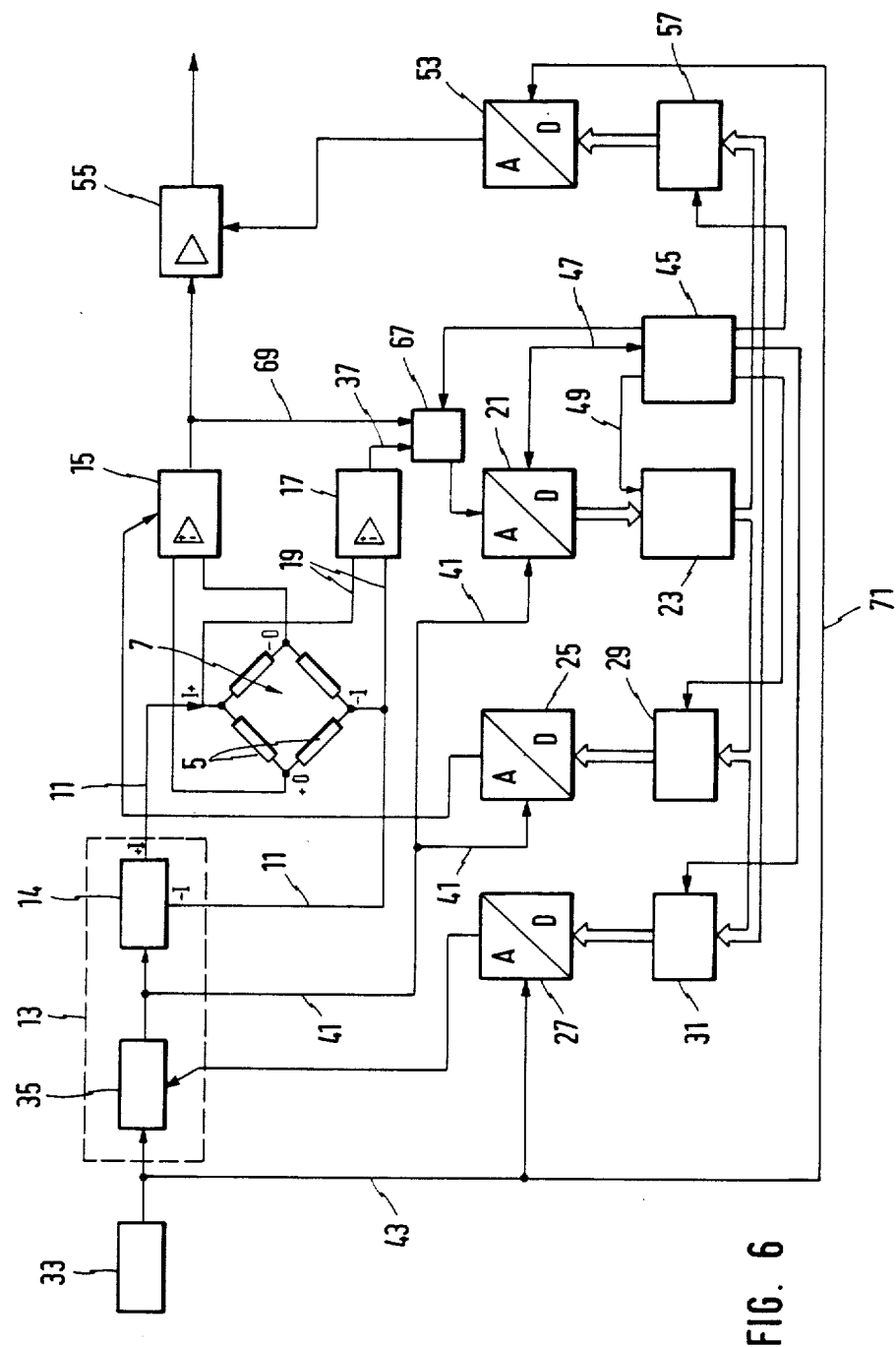
FIG. 6 is a block diagram of the principle of a linearity compensation circuit.

Shown in FIG. 6 is another variation of FIG. 2, according to which (exactly as in the case of the example of embodiment according to FIG. 5) it is additionally possible to accomplish linearizing of the pressure output signal. This demonstrates itself to be particularly favorable in the case of highly accurate pressure measuring devices.

As a complement to the circuit according to FIG. 2, provided in the example of embodiment according to FIG. 6 is an additional analog switch 67 at whose one input is present the voltage difference/input signal of the differential amplifier 17 and at its other input the temperature compensated pressure measurement signal, via a line 69 that runs from the analog switch 67 to the output of the output/differential amplifier 15. Fed over this analog switch, through means of appropriate time control, is the one and the other signal, selectably switched from the control unit 45 to the subsequent analog/digital converter 21 for digitalizing the signals. Stored in the following memory 23 then, besides the compensation values for zero point and sensitivity compensation, are also other digitalized compensation values for linearity compensation whereby the individual compensation values at the address input of the memory 23 are piloted, via the MSB control pulse, over the line 49 of the control unit 45.

The digitalized and stored compensation values are then fed, cyclically staggered, not only to registers 29 and 31 but rather, relative to the digitalized linearity compensation values, also to an additional register 57 for intermediate storage and further conveying to a subsequent digital/analog converter 53. The analog signal correspondingly generated via the converter 53 is then fed to a final amplifier 55 (differential amplifier), and actually its offset-input. This final amplifier 55 is connected in series with the output differential amplifier 15. Hence, by means of this circuit arrangement, the temperature compensated pressure measurement signal applied at the final amplifier 55 is compensated relative to the stored, digitalized compensation values in the memory 23 such that the temperature compensated measurement signal applied at the output of the final amplifier 55 is directly proportional to the pressure actually applied (present) at the measurement bridge 7.

For the sake of completeness, further pointed out is that the reference voltage is applied at the digital-/analog converter 53 via a line 71.

Deviating from the example of embodiment shown, it is naturally possible, by using an additional analog/digital converter and possibly an additional memory, to also do without the analog switch 67.

Finally, further pointed out is that, in particular in the case of the additionally provided linearity compensation, it has been shown to be favorable to use a memory with still greater capacities than precedingly explained.

Hence, the invention is suited not only for compensation in the case of pressure transducers, but also in the case of force and acceleration transducers using complete and half-bridges. The principal application here is with piezoresistive measured value transducers, e.g. also by means of strain gauges.

What is claimed is:

1. A method for compensation of an analog, temperature dependent differential output signal of a pressure measuring circuit in a piezoresistive pressure transducer, said measuring circuit including a measurement bridge disposed on a pressure measurement cell, wherein an analog difference/output signal of said measurement bridge is provided to an output differential amplifier for generating said differential output signal, said method including the steps of:
   (a) storing a plurality of fixed compensation values in a digital memory means;
   (b) converting a temperature dependent analog voltage difference/input signal of said measurement bridge to a digital difference signal;
   (c) providing said digital difference signal to said memory means and generating, as the output of said memory means and as a function of the magnitude of said digital difference signal, at least one digital compensation signal, each digital compensation signal corresponding to one of said stored compensation values;
   (d) converting each digital compensation signal into a corresponding analog compensation signal; and
   (e) providing each analog compensation signal to said pressure measuring circuit for compensation of said differential output signal, thus to generate a temperature compensated pressure measurement signal.

2. The method of claim 1 wherein:
said plurality of fixed compensation values includes sensitivity compensation values and zero point compensation values, and said step (c) includes generating a digital sensitivity compensation signal comprised of a selected one of said sensitivity compensation values, and a digital zero point compensation signal comprised of a selected one of said zero point compensation values.

3. The method of claim 2 wherein:
said step (d) includes converting said digital zero point compensation signal into a corresponding analog zero point compensation signal, and said step (e) includes providing said analog zero point compensation signal to an offset control input of said output differential amplifier.

4. The method of claim 2 wherein:
said pressure measuring circuit includes a current supply circuit for regulating the current in said measurement bridge, and said step (e) includes providing an analog sensitivity compensation signal corresponding to said digital sensitivity compensation signal to said current supply circuit.

5. The method of claim 2 wherein:
said step (e) includes providing an analog sensitivity compensation signal corresponding to said digital sensitivity compensation signal to said output differential amplifier.

6. The method of claim 2 wherein:
said step (e) includes providing to said pressure measuring circuit an analog zero point compensation signal corresponding to said digital zero point compensation signal, comprising an additive change to said pressure measurement signal.

7. The method of claim 2 wherein:
said step (e) includes providing an analog sensitivity compensation signal corresponding to said digital sensitivity compensation signal to effect a multiplicative change of the input voltage at at least one of:
   (i) said measurement bridge; and
   (ii) said output differential amplifier, thereby effecting a multiplicative change of said pressure measurement signal.

8. The method of claim 1 wherein:
said fixed compensation values include linearity compensation values, and said step (c) includes generating a digital linearity compensation signal comprised of one of said linearity compensation values, and step (e) includes providing an analog linearity compensation signal corresponding to said digital linearity compensation signal to said measuring circuit for compensation of said differential output signal.

9. The method of claim 8 wherein:
said pressure measuring circuit includes a further differential amplifier for receiving the output of said output differential amplifier and generating said pressure measurement signal, and wherein said analog linearity compensation signal is provided to said further differential amplifier.

10. In a pressure measuring circuit of a piezoresistive pressure transducer, said circuit including a measurement bridge and an output differential amplifier receiving an analog difference/output signal of said measurement bridge for generating an analog pressure measurement signal, and a current supply circuit; a temperature compensation circuit, said temperature compensation circuit including:
a first differential amplifier receiving an analog voltage difference/input of said measurement bridge; a first analog/digital converter for receiving the output of said first differential amplifier and converting said output to a digital difference signal; a digital memory means, having a plurality of digitalized temperature dependent compensation values stored therein, for receiving the output of said first differential amplifier and generating a digital compensation signal comprised of at least one of said temperature dependent compensation values selected as a function of the output of said first differential amplifier; and a digital/analog conversion means for receiving said digital compensation signal and converting it to a corresponding analog compensation signal, and for providing said analog compensation signal to said pressure measuring circuit.

11. The pressure measuring circuit of claim 10 wherein:

said digital/analog conversion means includes a digital/analog converter, the output of which is provided to said current supply circuit.

12. The pressure measuring circuit of claim 11 wherein:

said current supply circuit includes a voltage regulating unit receiving and controlled by the analog compensation signal of said digital/analog converter, thereby determining the amount of current supplied to said measurement bridge, said digital/analog converter comprising a first digital/analog converter for sensitivity compensation.

13. The pressure measuring circuit of claim 12 wherein:

said digital/analog conversion means further includes a second digital/analog converter, and the output of said voltage regulating unit is applied to said analog/digital converter and said second digital/analog converter as a reference signal for zero point compensation.

14. The pressure measuring circuit of claim 12 wherein:

said circuit further includes a reference voltage generator providing an input to said voltage regulating unit, said reference voltage generator further providing an input to said first digital/analog converter as a reference signal for sensitivity compensation.

15. The measuring circuit of claim 10 wherein:

said digital/analog conversion means includes a digital/analog converter, the output of which is provided to a gain control input of said output differential amplifier.

16. The pressure measuring circuit of claim 10 wherein:

said digital/analog conversion means includes a digital/analog converter, the output of which is provided to an offset control input of said output/differential amplifier (15).

17. The pressure measuring circuit of claim 10 wherein:

said temperature dependent compensation values include a plurality of sensitivity compensation values and a separately stored plurality of zero point compensation values, and wherein said digital/analog conversion means includes a first digital/analog converter for receiving said zero point compensation values, the output of said first digital/analog converter being provided to an offset control input of said output differential amplifier, and a second digital/analog converter receiving said sensitivity compensation values.

18. The pressure measuring circuit of claim 17 wherein:

said compensation circuit further includes a control unit for alternatively providing either of said zero point compensation values and said sensitivity compensation values wherein said memory means includes a programmable fixed memory, a first register for said zero point compensation values, and a second register for said sensitivity compensation values; wherein said control unit is in communication with said programmable fixed memory and provides first and second control unit outputs to said first and second registers, respectively; and wherein said first and second registers provide their outputs to said first and second digital/analog converters, respectively.

19. The pressure measuring circuit of claim 10 further including:

a second differential amplifier receiving as an input the output of said output differential amplifier; and wherein said compensation values include linearity compensation values, said digital/analog conversion means includes a linearity compensation digital/analog converter, and said analog/digital converter further receives the output of said output/differential amplifier; said digital/analog converter converting said digital compensation signal to a corresponding analog compensation signal applied to an offset control input of said second differential amplifier.

20. The pressure measuring circuit of claim 19 wherein:

said memory means includes a linearity compensation register connected to said linearity compensation digital/analog converter.

21. The pressure measuring circuit of claim 10 wherein:

said compensation values include a plurality of zero point compensation values, a plurality of sensitivity compensation values, and a plurality of linearity compensation values separately stored in said means.

22. The pressure measuring circuit of claim 21 wherein:

said temperature compensation circuit further includes an analog switch receiving as inputs the output of said first differential amplifier and the output of said output/differential amplifier, and a control unit for selectively and alternatively causing said analog switch to convey either of said first and second switch inputs to said analog/digital converter.

23. The pressure measuring circuit of claim 10 wherein:

said circuit is constructed as an integrated circuit.

24. The pressure measuring circuit of claim 23 wherein:

said memory means displays a capacity that is preferential between 32×4 to 128×6 bits.

25. The pressure measuring circuit of claim 23 wherein:

said memory means includes a programmable fixed value memory.

26. The pressure measuring circuit of claim 10 wherein:

said digitalized, temperature dependent compensation values are selected for storage in accordance with the individual characteristics of said measurement bridge.

27. The pressure measuring circuit of claim 10 wherein:

an additional resistance (RG) provided at said output differential amplifier for determining the gain.

* * * * *

UNITED STATES PATENT AND TRADEMARK OFFICE
CERTIFICATE OF CORRECTION

PATENT NO. : 4,715,003

DATED : December 22, 1987

INVENTOR(S) : Hans W. Keller and Michael Von Ritter

It is certified that error appears in the above-identified patent and that said Letters Patent is hereby corrected as shown below:

```
   Column 12, line 37, before the word "means" insert
-- memory --, in Claim 21.
```

Signed and Sealed this

Twenty-first Day of June, 1988

*Attest:*

DONALD J. QUIGG

*Attesting Officer*  *Commissioner of Patents and Trademarks*